United States Patent
Fox

(10) Patent No.: US 6,742,757 B2
(45) Date of Patent: Jun. 1, 2004

(54) RAIL FENCE FLAG HOLDER

(76) Inventor: Steven Alfred Fox, 2373 Boxwell Rd., Prospect, OH (US) 43342

(*) Notice: Subject to any disclaimer, the term of this patent is extended or adjusted under 35 U.S.C. 154(b) by 0 days.

(21) Appl. No.: 10/295,584

(22) Filed: Nov. 15, 2002

(65) Prior Publication Data

US 2003/0098403 A1 May 29, 2003

Related U.S. Application Data

(60) Provisional application No. 60/349,284, filed on Jan. 17, 2002, provisional application No. 60/333,006, filed on Nov. 26, 2001, and provisional application No. 60/333,061, filed on Nov. 26, 2001.

(51) Int. Cl.[7] .................................................. G09F 17/00
(52) U.S. Cl. ...................................... 248/538; 248/535
(58) Field of Search .............................. 248/539, 538, 248/541, 535

(56) References Cited

U.S. PATENT DOCUMENTS

| | | | | | |
|---|---|---|---|---|---|
| 981,603 A | * | 1/1911 | Adelson | ...................... | 248/538 |
| 1,053,255 A | * | 2/1913 | Ward | ........................... | 248/536 |
| 2,491,008 A | * | 12/1949 | Lake | ........................... | 224/103 |
| 2,534,117 A | * | 12/1950 | Flick | ...................... | 248/231.81 |
| 3,036,545 A | * | 5/1962 | Legg | ........................ | 116/28 R |
| 3,178,138 A | * | 4/1965 | Hessdoerfer et al. | ....... | 248/539 |
| 3,315,926 A | * | 4/1967 | Trenda et al. | ............... | 248/538 |
| 3,493,203 A | * | 2/1970 | Gualano | ...................... | 248/539 |
| 3,943,524 A | * | 3/1976 | Sample | ........................ | 343/888 |
| 4,163,426 A | * | 8/1979 | O'Neill | ...................... | 116/28 R |
| D265,324 S | * | 7/1982 | Hedgeman | .................... | D19/85 |
| 4,590,883 A | * | 5/1986 | Steed et al. | .................. | 116/173 |
| 4,657,249 A | * | 4/1987 | Offutt | .......................... | 473/485 |
| D303,003 S | * | 8/1989 | Combs | ....................... | D22/147 |
| D313,214 S | * | 12/1990 | Phillips et al. | ............. | D12/223 |
| 4,986,209 A | * | 1/1991 | Spica | ....................... | 116/28 R |
| 5,105,574 A | * | 4/1992 | Fast | ............................ | 43/21.2 |
| 5,233,938 A | * | 8/1993 | Lalo | ............................ | 116/173 |
| 5,332,196 A | * | 7/1994 | Wright | ........................ | 256/47 |
| 5,463,974 A | * | 11/1995 | Seeder | ........................ | 116/173 |
| 5,524,857 A | * | 6/1996 | Eisenberg et al. | .......... | 248/535 |
| RE35,731 E | * | 2/1998 | Lach | ........................... | 248/535 |
| 6,010,107 A | * | 1/2000 | Goldfarb | .................... | 248/512 |
| D421,238 S | * | 2/2000 | Dinsky | ....................... | D11/182 |
| 6,085,687 A | * | 7/2000 | Chester | ....................... | 116/173 |
| 6,378,453 B1 | * | 4/2002 | Conway | .................... | 116/28 R |

* cited by examiner

*Primary Examiner*—Leslie A. Braun
*Assistant Examiner*—Igrid M Weinhold

(57) ABSTRACT

The present invention is a fence flag holder used to display smaller sized flags, banners or pennants on the rail of vinyl fences and/or wood fences for decorative purposes. The flag holder is a "u-shaped" hook design comprising of a one-piece molded plastic bracket with a tube on the front to hold the flag shaft and display the flag at a forty-five (45) degree angle. The flag holder fits over the rail of a fence allowing the flag to be displayed at special times of the year and to be removed easily for storage when not in use.

2 Claims, 6 Drawing Sheets

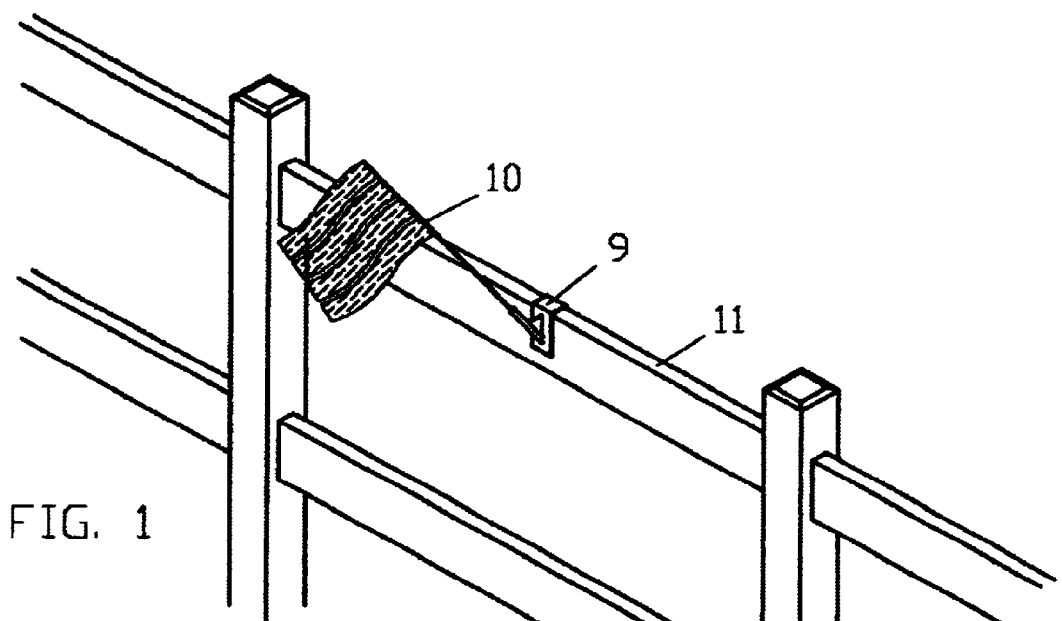
FIG. 1
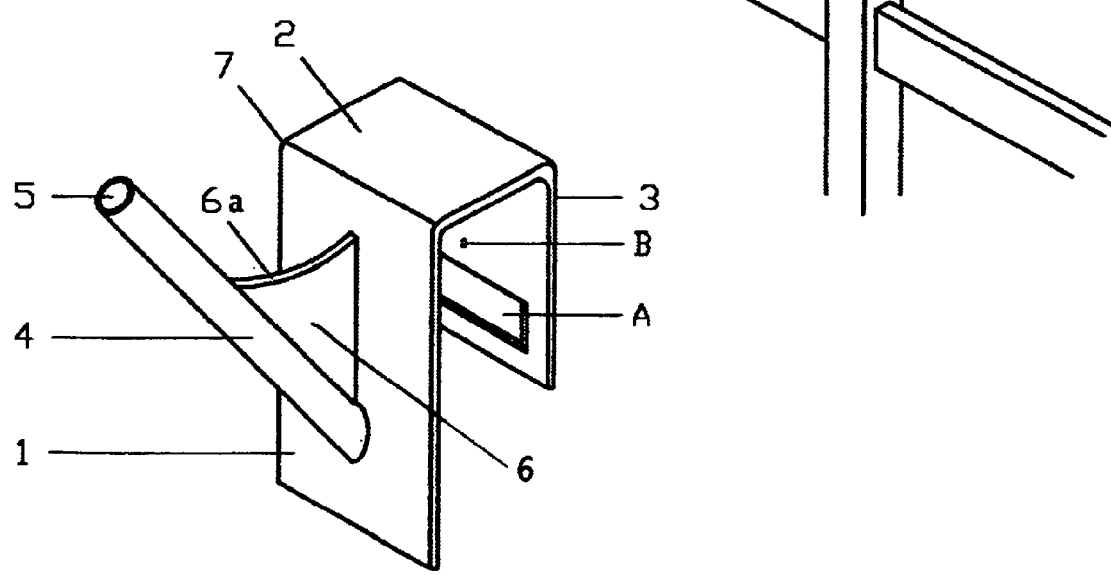
FIG. 1-A

RAIL FENCE FLAG HOLDER

CROSS-REFERENCE TO RELATED APPLICATIONS

This application claims the benefit of U.S. Provisional Patent Application Ser. No. 60/333,061, filed Nov. 26, 2001 and titled "Fence clip" and incorporated herein by reference. Related applications include U.S. Provisional Patent Application Ser. No. 60/333,006, filed Nov.26, 2001, titled "Post clip", and Ser. No. 60/349,284, filed Jan. 17, 2002, titled "Wall clip".

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates generally to flag accessories, holders and brackets, and more particularly, to a holder which can be attached over the rail of vinyl or wood fences. During festive times and national holidays, it is desirable to display flags of many sorts. There are many various patents for flag holding devices, but most are for the standard 3'×5' or 4'×6' flags and have not focused on the smaller flags, banners or pennants such as the memorial size flag (12"×16") or smaller. The standard size flags and flag holders look out of place when used on fences as they are too large. Most available flag holders require holes to be drilled on to the surface to which they are attached, but owners of vinyl fences usually do not want holes drilled into the vinyl surface, therefore leaving them with no practical means to attach flags to the fence, other than with duct tape, or other means which are not aesthetically pleasing.

The present flag holder is detachably mounted over the rail of the fence by means of a u-shaped hook, allowing the flag, banner, or pennant to be displayed at special times of the year without damaging the surface of the fence, and to be removed easily for storage when not in use.

Various patents have proposed different methods of displaying flags by attaching them to flat surfaces, by means of drilling holes into the surface and attaching with screws or other fasteners. U.S. Pat. No. Re. 35,731 to Lach, describes a flag pole bracket which must be attached to a flat surface by means of screws. U.S. Pat. No. 5,524,856 to Neely & Shriner describes a rail bracket flag holder, but this application merely provides a base to attach a conventional flag holder with bolts and wing nuts. Other previous patents for flag holders include U.S. Pat. No. 466,960 to Bert & Widmayer, U.S. Pat. No. 1,053,255 to Ward, U.S. Pat. No. 1,198,840 to Hanck & David, U.S. Pat. No. 1,632,726 to Conklin, and U.S. Pat. No. 2,914,278 to Burke. However none of these apply directly to attaching the holder to a fence rail. A design for a flag pole assembly, U.S. Pat. No. 5,253,608 to Burke also requires a bracket to be attached with screws to the desired surface.

U.S. Pat. No. 3,920,207 to Adamaitis describes a flag holder attached to a pole or a tree by means of straps, but this would be impractical for use on fence rails.

Patents for attaching decorative articles for display by means of hooking them over a door or a rail include U.S. Pat. No. 5,487,517 to Smith, U.S. Pat. No. 6,224,030 B1 to Hepworth, and U.S. Pat. No. 6,302,365 to Catanzarite et al, but these relate to articles which are suspended from the device, rather than inserted into a sheath, such as a flag staff.

BRIEF SUMMARY OF THE INVENTION

The present invention is a holder used to display smaller sized flags, banners or pennants on the rail of vinyl or wood fences without defacing or devaluing the surface of the fence, due to using a u-shaped hook to attach the holder to the fence. It is an objective of the present invention to be easily mounted or dismounted for display and storage purposes. It is a further objective of the present invention to provide a fence flag holder that is easy to use, stable, durable and reliable. It is a further objective of the present invention to be made of one-piece molded (ABS) durable plastic material which is aesthetically pleasing and simple in appearance and which will last for years of use. The fence flag holder can be produced in various colors to match the different colors of fences.

BRIEF DESCRIPTION OF THE DRAWINGS

FIG. 1 is a view of the one-piece molded plastic flag holder on the top rail of a fence. FIG. 1-A is a three-dimensional view of the one-piece molded plastic flag holder.

FIG. 6 is a sectional view illustrating the placement of the double-sided adhesive mounting tape for non-movement on a vinyl fence.

DETAILED DESCRIPTION OF THE INVENTION

A. Overview

Figure 2:
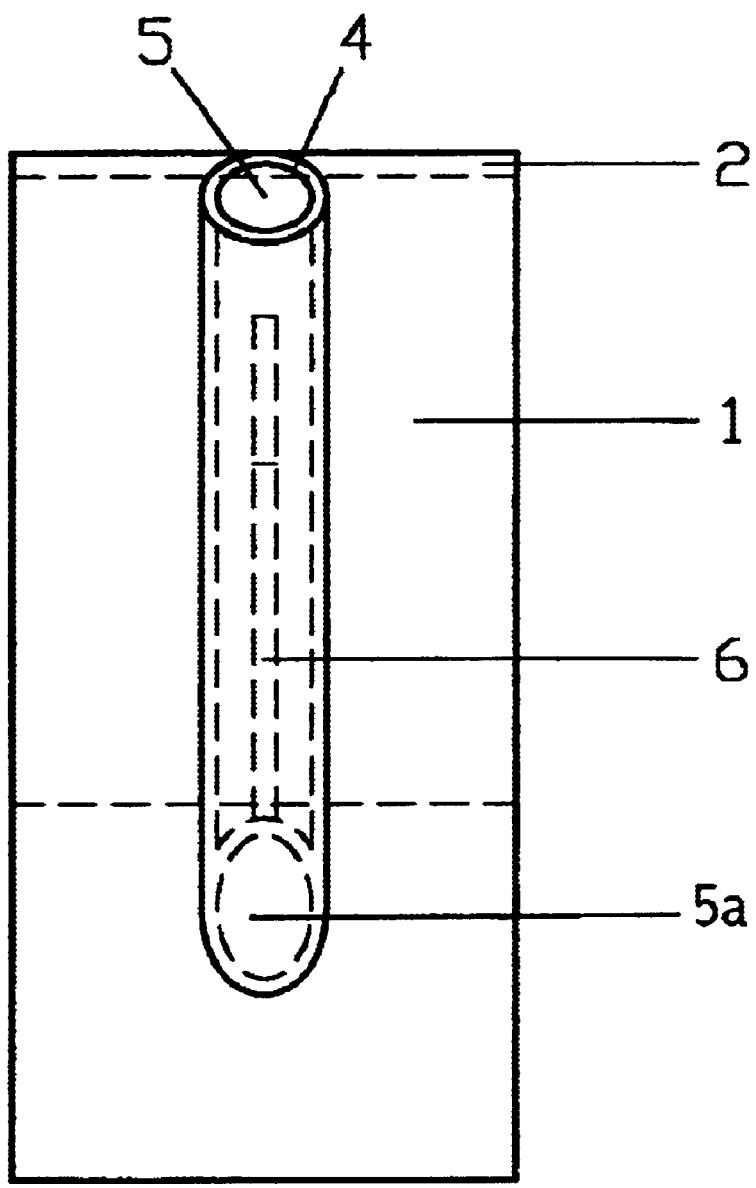
FIG. 2 is a front view showing the tube which holds wood dowel shaft of a flag, banner or pennant attached to the vertical support surface plate.

FIG. 1 illustrates the fence flag holder 9 as attached to a top rail 11 of a fence. It depicts the "u-shape" fence flag holder 9 with a shaft 10 of a small size flag (12 inches by 16 inches or smaller) inserted. FIG. 1-A depicts the various aspects of the "u-shape" fence flag holder 9 of FIG. 1. It shows the angled smooth-bored tube 4 which receives a flag shaft 10 attached by the support brace 6 to the face of the front vertical support surface plate 1 of the fence flag holder 9. FIG. 1-A. also shows the molded, rectangular tape insertion slot A located on the inside of the back vertical support surface plate 3 for a double-sided adhesive mounting tape (to be added). The tape to be used for non-movement purposes if a "teeter-totter" effect happens caused by the wind. FIG. 1-A also shows the placement of a pre-cast pilot hole B located on the outside of the back vertical support surface plate 3 for the same purpose, except for use on a wood fence.

B. Structure

The fence flag holder is tooled and died for a solid one-piece (ABS-Acrylonitrile Butadiene Styrene) plastic injection mold. There are many other types of materials that could be used which would generate the same form, fit and function, but not necessarily the same durability. The injection mold process uses raw plastic material which is heated in a chamber until it reaches its melting point. It is then injected into a mold where it is allowed to cool to become solid and then it is ejected from the mold.

FIG. 2 illustrates a preferred embodiment of the front view of the fence flag holder 9, front vertical support surface plate 1, and an angled smooth-bored tube 4 with a through hole 5 for holding a flag shaft 10, the through hole 5 extrudes all the way through the front vertical support surface plate 1 at the lower portion of the front vertical support surface plate 1 and forms opening 5a to allow moisture to exit.

Figure 3:
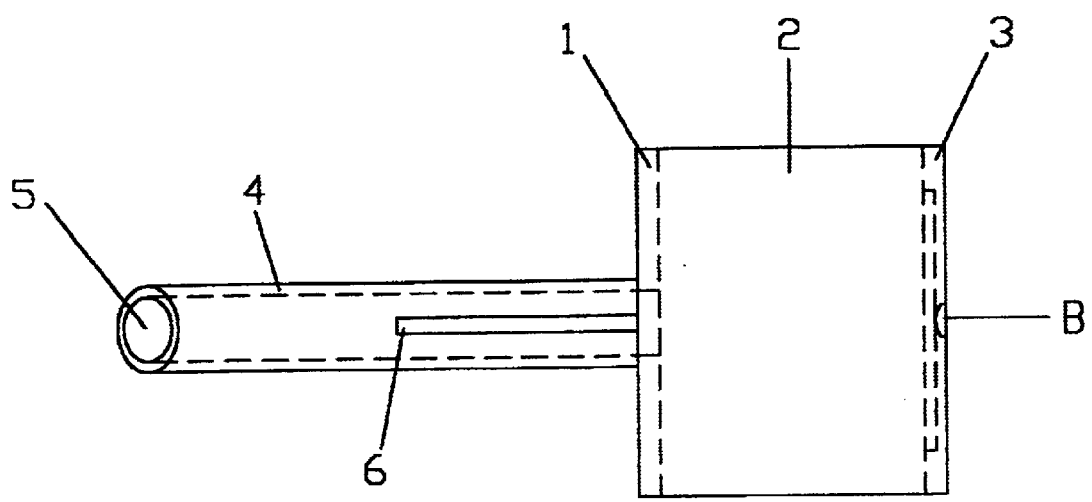
FIG. 3 is a top view looking down upon the horizontal top support surface plate of the one-piece molded plastic flag holder. It is a perspective view showing the top of the "u-shaped" flag holder and the flag shaft holding tube with its support brace.

FIG. 3 illustrates a preferred embodiment of the top view of the fence flag holder 9, top horizontal support surface plate 2, and angled smooth-bored tub 4 with a through hole 5 for holding a flag shaft 10. It also shows the top of the support brace 6 attached to the angled smooth-bored tube 4 and the front vertical support surface plate 1. It also shows the top horizontal support surface plate 2 attached to the front vertical support surface plate 1 end to the back vertical support surface plate 3 with the width of the top horizontal support surface plate 2 being of sufficient size to hook over the top rail 11 of a vinyl or wood fence.

Figure 4:
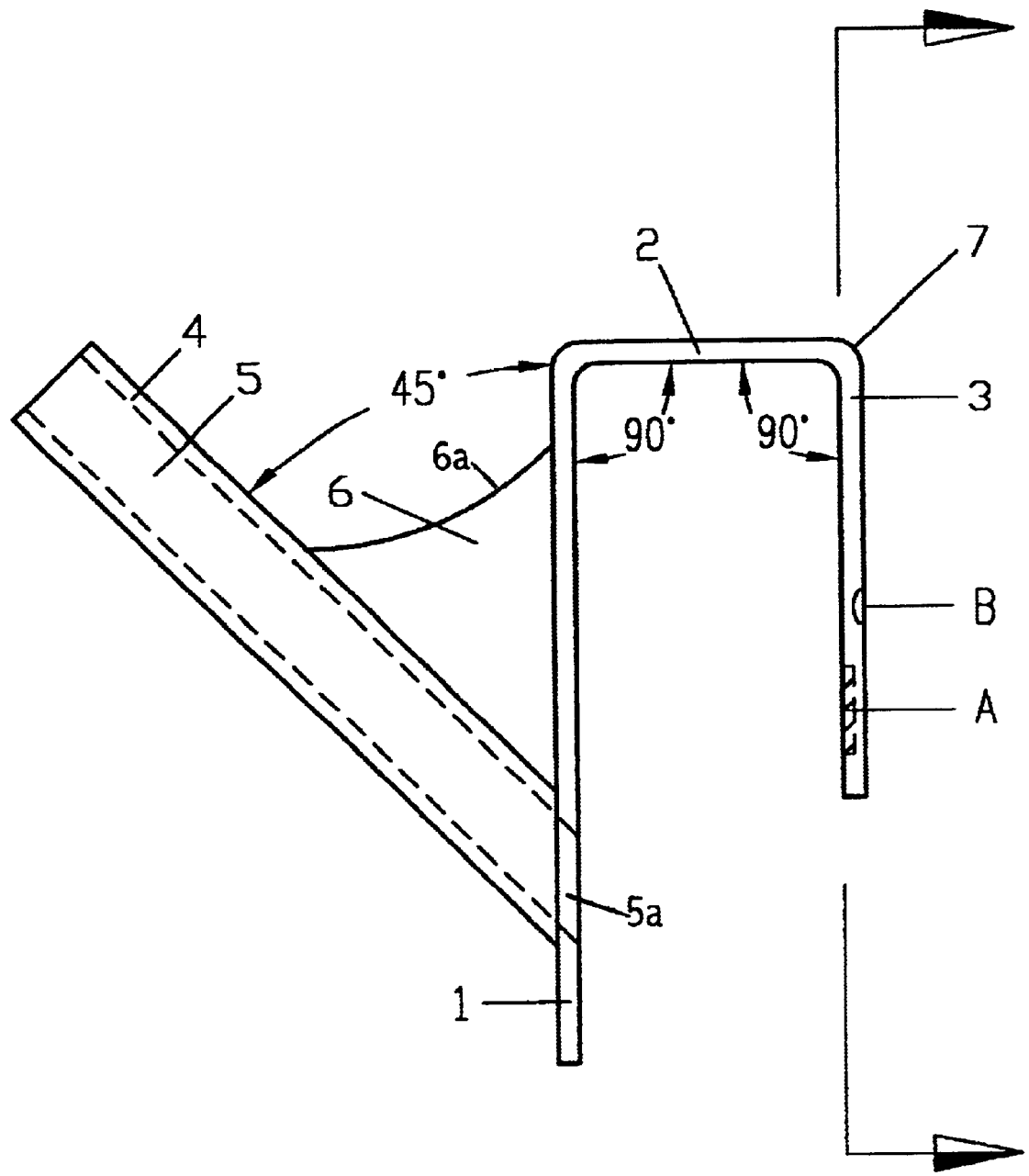
FIG. 4 is a side view of the one-piece molded plastic flag holder showing the flag shaft tube holder and the support brace which attaches to the "u-shaped" flag holder.
Figure 6:
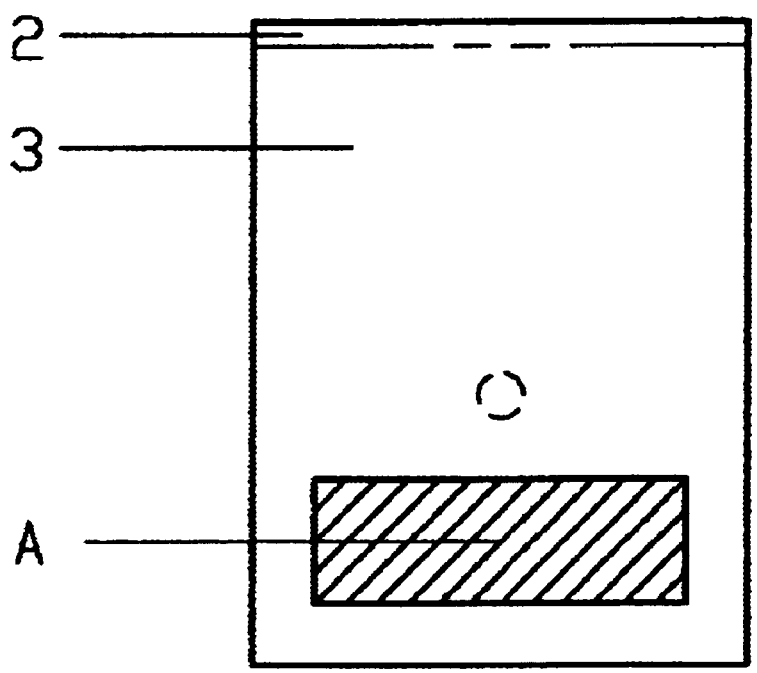
FIG. 6 shows the placement of double-sided adhesive mounting tape A, and the pre-cast pilot hole B on the back side of the "u-shape" flag holder.

FIG. 4 illustrates a preferred embodiment of the side view of the fence flag holder 9, front vertical support surface plate 1, and an angled smooth-bored tube 4 having walls of solid construction with a through hole 5 for holding a flag shaft 10, the through hole 5 extrudes all the way through the front vertical support surface plate 1 and forms opening 5a at the lower portion of the front vertical support surface plate 1 to allow moisture to exit. The front vertical support surface plate 1 is of one solid piece other than the opening 5a. It also illustrates the support brace 6 connecting the flag shaft holding tube 4 to the front vertical support surface plate 1 at a forty-five (45) degree angle from the tube 4 to the front vertical support surface plate 1. It also shows the support brace 6 forming a bridge between the front vertical support surface plate 1 and the angled smooth-bored tube 4. The support brace 6 has a concave top edge 6a. It shows the front vertical support surface plate 1, which in turn is contiguous to the top horizontal support surface plate 2, which in turn is contiguous to the back vertical support surface plate 3, forming a "u-shape" hook design of the entire embodiment being at ninety (90) degree angles with the top horizontal support surface plate 2. The top horizontal support surface plate 2 is of sufficient width to hook over the top fail 11 of a vinyl or wood fence. The ninety (90) degree angles are ⅛ inch radial typical smooth corners 7. The "u-shape" fence flag holder 9 is to be approximately ⅛ inch thick. FIG. 6 is a cross section of the inside of the back vertical support surface plate 3.

Figure 5:
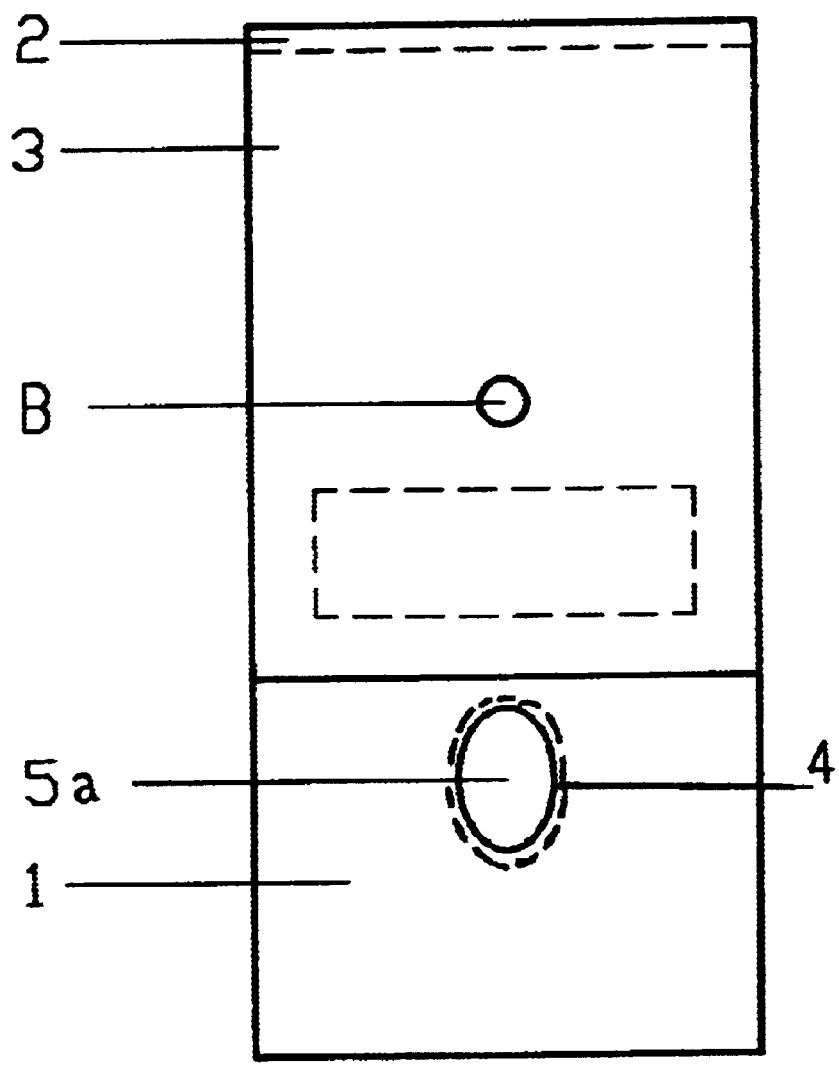
FIG. 5 is the perspective view of the back vertical support surface plate of the one-piece molded plastic flag holder showing the length of the back lip of the "u-shaped" flag holder with a pre-cast hole for anchoring the flag holder to a wood fence for non-movement. It also shows the open smooth-bored tube which holds the flag shaft on the front vertical support surface plate.

FIG. 5 illustrates the outside beck view of the fence flag holder 9 having a partial view of the back side of the front vertical support surface plate 1. It shows the placement of the pre-cast pilot hole B centered from the bottom of the back vertical support surface plate 3. It also shows the placement of the opening 5a formed by through hole 5 which extrudes all the way through the front vertical support surface plate 1, being at the lower portion of the front vertical support surface plate 1.

FIG. 6 illustrates the inside view of the back vertical support surface plate 3. It also shows the placement of the rectangular molded insertion slot A for double-sided adhesive mounting tape to be added.

What is claimed, as being new and desired to be protected by Letters Patent of the United States is as follows:

1. A fence flag holder for flags, banners or pennants, sized smaller than 12 inches by 16 inches intended to be mounted on a rail of a vinyl and or wood fence in a manner which can easily be removed comprising;

a plastic "u-shape" hook holder molded in one piece comprising an angled smooth-bored tube having walls of solid construction attached to a front vertical support surface plate, said tube having a through hole to receive a shaft of a flag, banner, or pennant, said through hole forming an opening through the front vertical support surface plate to allow moisture to exit, said opening through said front vertical support surface plate being at approximately the bottom fourth of the surface of said plate, said plate being of one solid piece except for the area of said opening;

a support brace attached to said smooth-bored tube by which said tube projects at a forty-five (45) degree angle from said front vertical support surface plate, said support brace forming a bridge between the front vertical support surface plate and the smooth-bored tube, wherein said support brace has a concave top edge;

a horizontal top support surface plate attached to said front vertical support surface plate;

a back vertical support surface plate attached to said horizontal top support surface plate, said back vertical support surface plate providing a means of attachment to a fence rail whereby the flag holder can be easily mounted for display purposes and removed for storage when not in use.

2. The plastic "u-shape" holder of claim 1 wherein said back vertical support plate further comprising, a molded rectangular slot on the inside of the back vertical support surface plate to receive double-sided adhesive mounting tape whereby stability of placement on a vinyl fence is achieved;

a pre-cast pilot hole on the back side of the back vertical support surface plate for use on a wood fence whereby stability of placement on the fence is achieved.

* * * * *

UNITED STATES PATENT AND TRADEMARK OFFICE
CERTIFICATE OF CORRECTION

PATENT NO.         : 6,742,757 B2                                       Page 1 of 1
APPLICATION NO. : 10/295584
DATED              : June 1, 2004
INVENTOR(S)        : Steven Alfred Fox It is certified that error appears in the above-identified patent and that said Letters Patent is hereby corrected as shown below:

Title Page: Assistant Examiner, change "Igrid" to "Ingrid"

Detailed Description of the Invention:

Column 3, line 25, change "tub" to --tube--

Column 3, line 30, change "end" to --and--

Column 3, line 56, change "fail" to --rail--

Column 4, line 3, change "beck" to --back--

Signed and Sealed this

Twenty-second Day of January, 2008

JON W. DUDAS
*Director of the United States Patent and Trademark Office*